United States Patent
Ketchum et al.

(10) Patent No.: US 6,744,885 B1
(45) Date of Patent: Jun. 1, 2004

(54) ASR TALKOFF SUPPRESSOR

(75) Inventors: Richard Harry Ketchum, Naperville, IL (US); Anand Rangaswamy Setlur, Naperville, IL (US); David Lynn Thomson, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/512,585

(22) Filed: Feb. 24, 2000

(51) Int. Cl.7 .............................. H04M 9/08; G10L 9/18
(52) U.S. Cl. .......................... 379/406.03; 379/406.07; 379/3; 370/286; 370/288; 370/289; 704/226; 704/233
(58) Field of Search ................... 379/406.01, 406.03, 379/406.05, 406.07, 72, 80, 88.01, 3, 15.01; 704/214, 215, 226, 227, 228, 233; 370/286, 288, 289

(56) References Cited

U.S. PATENT DOCUMENTS

| | | | | |
|---|---|---|---|---|
| 4,897,832 A | * | 1/1990 | Suzuki et al. ............. | 370/287 |
| 4,914,692 A | * | 4/1990 | Hartwell et al. ......... | 379/406.03 |
| 5,155,760 A | * | 10/1992 | Johnson et al. .......... | 379/88.01 |
| 5,475,791 A | * | 12/1995 | Schalk et al. ............. | 704/233 |
| 5,572,570 A | * | 11/1996 | Kuenzig ..................... | 379/1.02 |
| 5,633,909 A | * | 5/1997 | Fitch ........................ | 379/29.01 |
| 5,742,929 A | * | 4/1998 | Kallman et al. ........... | 704/251 |
| 5,749,072 A | * | 5/1998 | Mazurkiewicz et al. .... | 704/275 |
| 5,822,397 A | * | 10/1998 | Newman .................. | 379/27.02 |
| 5,933,475 A | * | 8/1999 | Coleman ................. | 379/10.01 |
| 5,940,472 A | * | 8/1999 | Newman et al. ......... | 379/10.02 |
| 5,978,763 A | * | 11/1999 | Bridges ...................... | 704/233 |
| 6,098,040 A | * | 8/2000 | Petroni et al. ............ | 704/234 |
| 6,134,322 A | * | 10/2000 | Hoege et al. ........... | 379/406.08 |
| 6,304,634 B1 | * | 10/2001 | Hollier et al. ........... | 379/22.02 |
| 6,477,492 B1 | * | 11/2002 | Connor ...................... | 704/236 |
| 6,574,601 B1 | * | 6/2003 | Brown et al. ............. | 704/270.1 |
| 6,606,595 B1 | * | 8/2003 | Chengalvarayan et al. . | 704/256 |

* cited by examiner

Primary Examiner—Binh Tieu

(57) ABSTRACT

A system and method provide ASR talkoff suppression in a prompt-and collect voice transaction system in which a prompt signal is sent and an input signal is received. A comparison is made of a characteristic of the prompt signal and the input signal. Processing of the input signal to reduce the likelihood of an ASR response thereto is performed if the result of the comparison satisfies a predetermined criterion.

27 Claims, 3 Drawing Sheets

ASR TALKOFF SUPPRESSOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to Automated Speech Recognition (ASR) systems used to provide voice-automated services. More particularly, the inventions concerns an ASR talkoff suppressor and related method for an ASR-based "prompt-and-collect" voice transaction system, whereby spurious ASR responses due to high-energy prompt echoes are eliminated.

2. Description of the Prior Art

In voice communication systems, such as the Public Switched Telephone Network (PSTN), ASR technology has been implemented to automate various network and (non-network) functions. So-called prompt-and-collect voice transaction systems, for example, play stored voice messages that prompt callers to make selections regarding service options that are available on the implementing system. For example, a network service provider may use prompt-and-collect interactions to provide automated operator assistance to callers. Similarly, a network subscriber may program prompt-and-collect features into its automated voice transaction processing equipment designed for supporting call center operations, voice-automated purchasing, and other services.

In the typical prompt-and-collect voice transaction scenario, the caller is given the option of making a selection by entering a number via a telephone handset or by providing a voice response. Often the voice response options are limited to a few one- or two-syllable menu command words and/or numbers, but the allowed responses can be longer in some cases. An ASR unit associated with the prompt-and-collect voice transaction system is programmed to detect, interpret and convert the caller's voice response into a numeric selection output that triggers a particular action.

Problems can arise in the prompt-and-collect environment if line echoing is present. In that case, a loud prompt echo may be detected by the ASR unit's end point detector and interpreted as incoming speech, such that a spurious ASR response is produced. Some prior art prompt-and-collect systems attempt to solve this problem by utilizing echo cancellation processing. The goal of such processing is to provide sufficient Echo Return Loss Enhancement (ERLE) to preclude the input signal from ever having enough energy to trigger the ASR unit's end point detector. However, when the prompt echo is sufficiently loud, there can be sufficient energy in the incoming echo-canceled signal to trigger the end point detector and cause a misrecognition. Accordingly, a need exists for an improvement in a prompt-and-collect voice transaction system that prevents prompt echo-induced end point detector misfires.

SUMMARY OF THE INVENTION

The foregoing problems are solved and an advance in the art is obtained by a novel ASR talkoff suppressor and related method that greatly improves the operation of a prompt-and-collect voice transaction processing system. In accordance with the inventive subject matter, a prompt signal is sent and an input signal is received. A comparison is made of a characteristic of the prompt signal and a characteristic of the input signal. Following echo cancellation processing, additional processing of the input signal is performed to reduce the likelihood of a spurious ASR response thereto if the result of the prompt signal/input signal comparison satisfies a predetermined criterion.

In preferred embodiments of the invention, the aforementioned signal characteristic of the prompt signal is signal energy and the signal characteristic of the input signal is signal energy following echo cancellation of the input signal. Thus, the comparison step may include sampling the prompt signal and the echo-cancelled input signal and determining the respective energies thereof This can be done using a "leaky integrator" that employs an effective window length of a predetermined number of samples of the prompt signal and the echo-cancelled input signal. The comparison step preferably also includes determining whether the difference between the respective energies of the prompt signal and the echo-cancelled input signal is greater than a predetermined threshold.

The processing of the echo-cancelled input signal to reduce the likelihood of a spurious ASR response can include randomizing the echo-cancelled input signal to make it more noise-like. The processing can also include attenuating the echo-cancelled input signal.

A determination can also be made as to whether the input signal corresponds to a person speaking, and if so, a different criterion is used for evaluating the prompt signal/input signal comparison than if the input signal does not correspond to a person speaking. This determination includes determining a peak energy of the prompt signal and a peak energy of the input signal. The peak energy of the prompt signal is determined as the square of the largest sample of a first predetermined number of samples of the prompt signal. The peak energy of the input signal is determined as the square of the largest sample of a second predetermined number of samples of the input signal. The determination also includes calculating whether the difference between the respective peak energies of the prompt signal and the input signal is less than a predetermined threshold.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF THE PREFERRED EMBODIMENT

Figure 1:
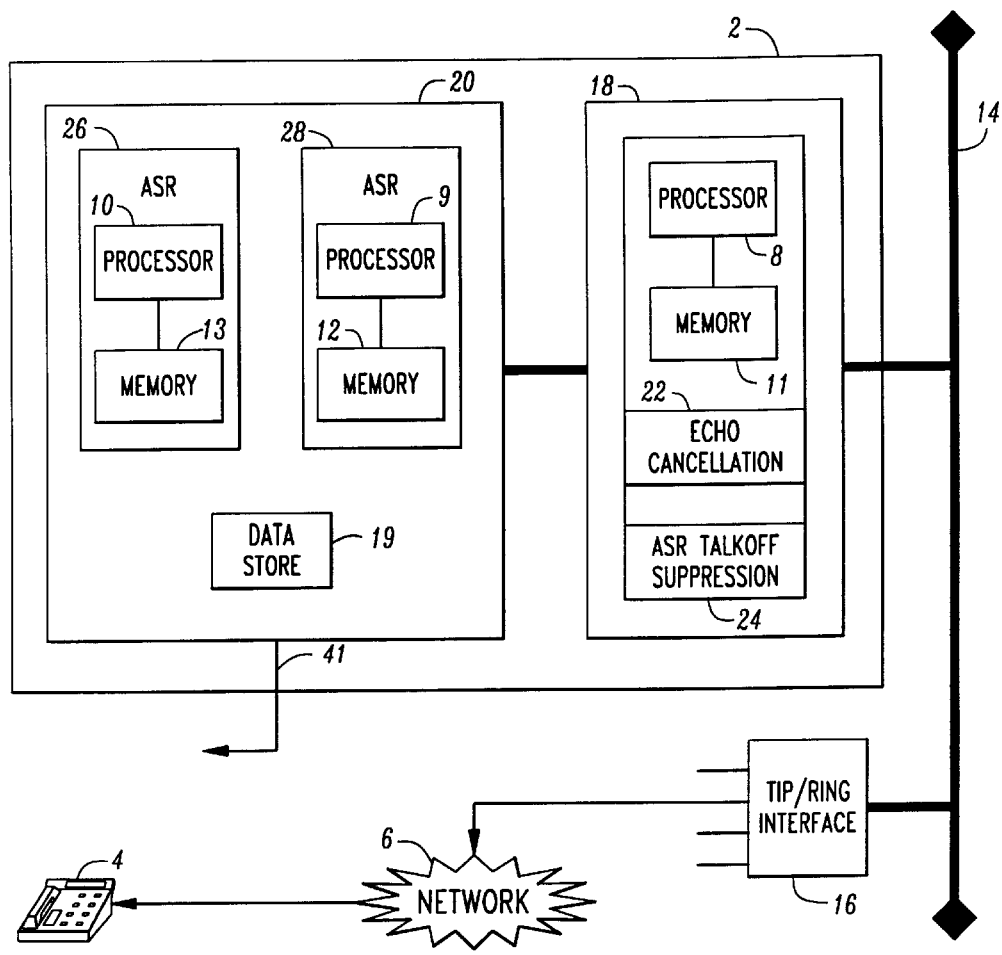
FIG. 1 is a functional block diagram showing relevant portions of an exemplary apparatus implementing a prompt-and-collect speech processing system and incorporating an ASR talkoff suppressor in accordance with the invention.

Turning now to the figures, wherein like reference numerals represent like elements in all of the several views, FIG. 1 illustrates an exemplary prompt-and-collect speech processing apparatus 2 communicating with, and providing automated voice processing service on behalf of, a caller (not shown) operating Customer Premises Equipment (CPE) 4. The CPE 4 communicates with the speech processing apparatus 2 via a telecommunication network 6, which could be a circuit-switched voice network such as the PSTN, or a packet data network such as the Internet. Although not shown in FIG. 1, it will be understood that the communication pathway between the speech processing apparatus 2 and the CPE 4 includes appropriate local access systems for connecting the communicating entities to the network 6. These may include switches, gateways or other devices, depending on the network type.

The speech processing apparatus 2 may be implemented in an exemplary configuration using an AYC 51™ circuit pack from Lucent Speech Solutions, Inc. In this implementation, the speech processing apparatus 2 includes three software-controlled processors 8, 9 and 10, each accessing respective memories 11, 12 and 13, containing control software for performing the speech processing functions of the apparatus 2. The speech processing apparatus 2 mounts into a PEB (Pulse Code Modulation Expansion) bus 14, which carries multiple voice channels containing prompt signals and input signals to and from a tip/ring interface 16 connected to the network 6.

The interface 16 transfers voice traffic between the network 6 and the bus 14. The network side of the interface 16 is analog in nature, carrying tip and ring signals, whereas the bus side of the interface 16 is digital, carrying channelized PCM (Pulse Code Modulation) voice frames. Internally, the interface 6 interface 16 performs the usual A/D (Analog-to-Digital) and D/A (Digital-to-Analog) conversions of a CO (Central Office) line card. It will thus be appreciated that, with respect to the CPE 4, the tip signal thereof is carried as PCM traffic on a first voice channel of the bus 14, while the ring signal thereof is carried as PCM traffic on a second voice channel of the bus 14.

The speech processing apparatus 2 includes a front end processing section 18, comprising the processor 8 and the memory 11, and a back end processing section 20, comprising the processors 9/10 and the memories 12/13. Functionally, the front end section 18 represents an input/output preprocessor unit wherein conventional echo cancellation is performed in software at 22, and in which ASR talkoff suppression is also performed in software at 24 in accordance with the preferred embodiment of the invention. The back end section 20 includes ASR functional units 26 and 28, which perform ASR processing according to conventional speech recognition algorithms in support of conventional prompt and collect operations. A data store 19 stores voice information used to provide output prompts, and may also store voice responses received as input.

Figure 2:
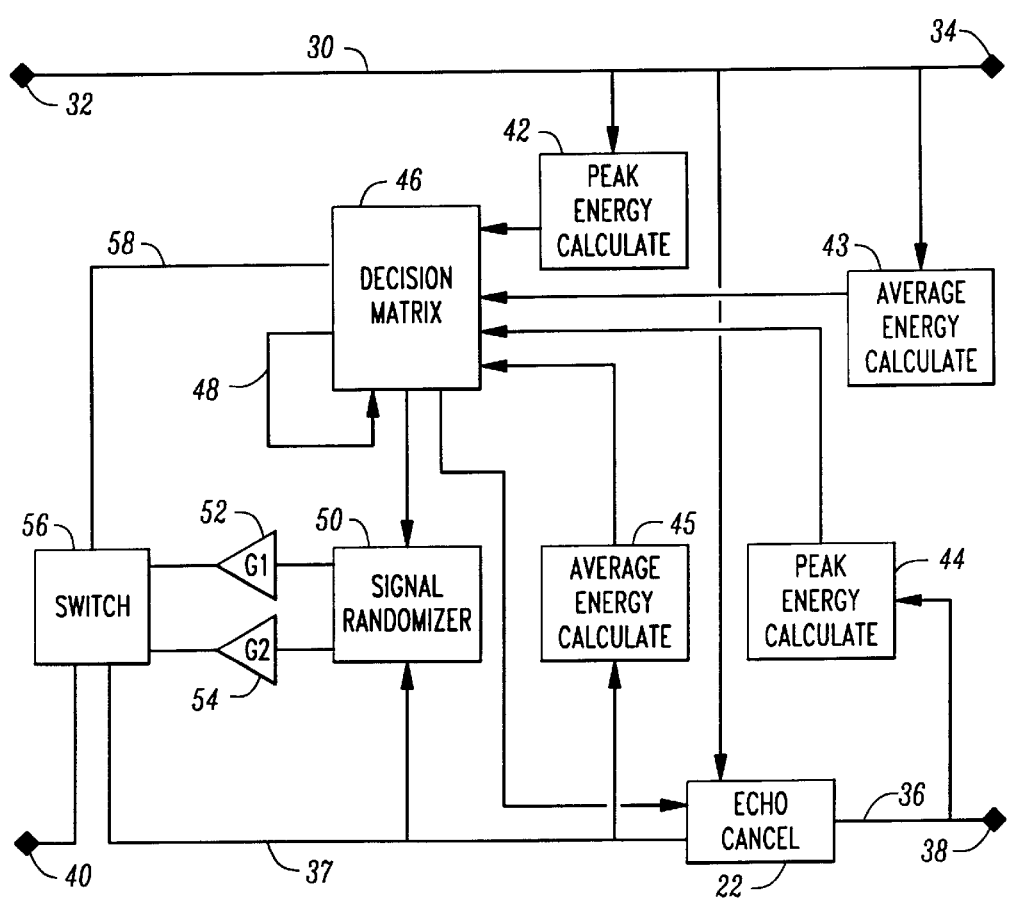
FIG. 2 is a functional block diagram showing components of the ASR talkoff suppressor illustrated in FIG. 1.

Turning now to FIG. 2, the functional components of the ASR talkoff suppressor 24, which is preferably implemented as an enhancement to the echo cancellation software 22 running on the processor 8, are shown relative to a single prompt signal/input signal channel pair. A prompt channel 30 carries a prompt signal between a prompt signal input port 32 (logically connected to the back end processing section 20) and a prompt signal output port 34 (logically connected to the bus 14). An input channel 36 carries an input signal between an input signal input port 38 (logically connected to the bus 14) and the echo canceller 22. The echo canceller 22 is responsive to the prompt channel 30 and the input channel 36 to create an echo-cancelled input signal, from which part of the echo received from the input signal has been removed. Channel 37 carries the echo-cancelled input signal from the echo canceller 22 to an output port 40 (logically connected to the back end processing section 20).

During a prompt-and-collect sequence, the prompt signal is generated from information stored in the data store 19 by the back end processing section 20. The prompt signal is forwarded through the front end processing section 18 and then placed on the bus 14 for delivery to a person communicating with the speech processing apparatus 2, such as a caller operating the CPE 4. The input signal from the caller is retrieved from the bus 14 by the front end processing section 18. Following echo cancellation processing, and with ASR talkoff suppression as described in more detail below, the input signal is fed to the back end processing section 20 for ASR analysis. Thereafter, an output line 41 from the back end processing section 20 (see FIG. 1) provides a control signal that corresponds to the caller's verbal response, as interpreted by the ASR units 26 and 28. The control signal is delivered to a processor (not shown) that utilizes the signal to perform a predetermined task.

Returning now to FIG. 2, a prompt peak signal energy calculator 42 and an input peak signal energy calculator 44 are respectively connected to receive signal samples from the prompt signal channel 30 and the input signal channel 36. Average energy calculators 43 and 45 compute average energies on the received samples of the prompt signal and the echo-cancelled input signal, respectively.

The peak energy value for the prompt signal ($P_p$) is calculated by the prompt signal peak energy calculator 42 and the peak energy value for the input signal ($P_i$) is calculated by the input signal peak energy calculator 44. The peak energy values are calculated by squaring the samples of the signal being measured, and selecting the largest squared sample. The prompt signal peak energy value $P_p$ represents the square of the sample with the highest energy among the last M+N (defined below) prompt signal samples taken. The input signal peak energy value $P_i$ represents the square of the sample with the highest energy among the last N (defined below) input signal samples taken. The signal samples can be any identifiable block of digital signal information, such as bytes, words, DS0 frames, or other information units. The value used for N in the preferred embodiment of the invention is based on the echo cancellation unit 22, which uses an adaptive filter of M coefficients, each of which corresponds to a prompt signal sample in the echo cancellation unit's delay line. It is convenient to select a value for N that divides evenly into M. In a conventional echo cancellation unit, each sample is one PCM word and the "tail" in the echo cancellation unit's delay line contains M such words. For a typical tail of 32 milliseconds, M is 256 and N is conveniently selected to be sixteen, which is number of samples taken during each sampling interval, as described in more detail below.

The average energy value for the prompt signal ($E_p$) is calculated by the prompt signal average energy calculator 43. The average energy value for the echo-cancelled input signal ($E_i$) is calculated by the average energy calculator 45. As explained in more detail below, this calculation is made following echo cancellation on the input signal. The average energy values are calculated by taking samples of the signal being measured, and using a leaky integrator to determine average signal energy in the samples taken. This integrator is a first order IIR (Infinite Impulse Response) filter with only a denominator term of the form $y[n]=G*x[n]+(1-G)*y[n-1]$, where n is the sample number, $x[n]$ is the value of a single sample of the prompt signal energy or the echo-cancelled input signal energy, respectively, $y[n]$ is the average energy value of the prompt signal or the echo cancelled input signal, respectively, and G=1/M, where M is an integer corresponding to the range of samples which contribute most to the average. This serves to estimate an average value of x over a time period that approximately corresponds to the past M samples. Preferably, the value of M is the same M value used in the peak signal calculations, i.e, the number of samples present in the echo canceller delay line. Thus, in the example give above where M=256, the prompt signal average energy value $E_p$ represents the average energy over a sample window approximately comprising the last 256 prompt signal samples taken. Similarly, the echo-cancelled input signal average energy value $E_i$ represents the average energy over a sample window approximately comprising the last 256 echo-cancelled input signal samples taken.

Having now defined the terms $E_p$, $E_i$, $P_p$, and $P_i$, the description which follows sets forth several energy calculations that are performed to implement ASR talkoff suppression in accordance with the invention. It is to be noted that, when used in these equations, the terms $E_p$, $E_i$, $P_p$, and $P_i$ are converted to a log scale so that they represent energy in units of decibels (dB). It is convenient to use log energy instead of absolute energy because energy ratios are easily computed through subtraction in the log domain. When an energy equation refers to a difference in energy, it will thus be understood that a decibel scale is being used, and that the equations actually involve the subtraction of log energy terms.

Once the peak and average signal energies are calculated, a decision matrix 46 calculates information about the prompt and echo-cancelled input signals that is used to determine whether the echo-cancelled input signal requires additional processing. The decision matrix 46 first attempts to determine the operating point of the prompt-and-collect transaction that produced the samples taken by the peak energy calculators 42 and 44. In particular, the decision matrix 46 attempts to determine whether the caller operating the CPE 4 has begun to speak after a prompt message has been sent by the speech processing apparatus 2. To determine when the caller has begun to speak, a comparison of $P_p$ and $P_i$ is made. If the difference between $P_p$ and $P_i$ is less than a predetermined value of J, measured in decibels (i.e., $P_p-P_i<J$ dB) it is declared that the caller has begun to speak and a Voice Activity Detector (VAD) flag 48 is set by the decision matrix 46 to designate that condition. The value J is implementation specific. For the AYC 51™ speech processor, a J value of 6 dB has been found to work well.

Having determined the operating point, the decision matrix 46 next compares the average signal energy values to determine whether the echo-cancelled input signal requires processing or should be fed directly to the output port 40 without processing. If the caller has not yet begun to speak, as indicated by the VAD flag 48 not being set, a comparison is made to determine if the difference between $E_p$ and $E_i$ is greater than a first predetermined value of K1 (i.e., $E_p-E_i>K1$). If the caller has begun to speak, as indicated by the VAD flag 48 being set, a comparison is made to determine if the difference between $E_p$ and $E_i$ is greater than a second predetermined value of K2 (i.e., $E_p-E_i>K2$). The values of K1 and K2 are implementation specific. For the AYC 51™ speech processor, respective K1 and K2 values of about 20 dB and 30 dB have been found to work well. The goal is that when the caller has not begun to speak, the less stringent K1 value should be used to make it more likely that additional processing will be performed. When the caller has begun to speak, the goal is to only act on input signals that correspond to sections of silence or sections of speech that are characterized as unvoiced and hence noise-like. The more stringent K2 value is used to make it less likely that the input signal will be additionally processed while the caller is speaking. If $E_p-E_i>K1$ or $E_p-E_i>K2$, the input signal is weak relative to the prompt signal (i.e., it is judged to be an echo) and must be additionally processed to reduce the likelihood of a spurious ASR response. If $E_p-E_i<=K1$ or $E_p-E_i<=K2$, the input signal is large relative to the prompt signal (i.e., it is not classified as an echo) and is not additionally processed. The data is passed directly from the output of the echo canceller 22 to the output port 40.

The processing of the input signal is performed by a signal processer (Randomizer) 50 and a pair of attenuators 52 and 54. The signal processor 50 receives the echo-cancelled input signal from the echo canceller 22. It introduces random characteristics into the echo-cancelled input signal such that the signal becomes very white noise-like. The randomized (whitened) output of the signal processor 50 is then fed to the attenuators 52 and 54. The attenuator 52 is for use before the caller has begun to speak. It attenuates the randomized signal by a predetermined value of L1 dB. The attenuator 54 is for use after the caller has begun to speak. It attenuates the randomized signal by a predetermined value of L2 dB. The values of L1 and L2 are implementation specific. For the AYC 51™ speech processor, respective L1 and L2 values of 10 dB and 3 dB have been found to work well. The stronger L1 value used before the caller has begun to speak causes the incoming signal to be rendered sufficiently diminished in amplitude that it is not recognized as a speech sequence by the ASR speech processor 22. The softer L2 value used after the caller has begun to speak causes less attenuation of the input signal to reduce the likelihood of interfering with the incoming speech patterns. In an alternative arrangement, randomizer 50 passes speech through to attenuators 52 and 54 without randomizing, so that the signal is reduced in volume, but not randomized.

Completing the operation of the ASR talkoff suppressor 24 is a switch 56. The switch 56 is controlled by the decision matrix 46 through a control line 58. The switch 56 can be set to allow either an unprocessed (echo-cancelled) input signal or a processed (echo-cancelled) input signal to be sent to the input signal output port 40. In addition, selection can be made between the output of the attenuator 52 and the output of the attenuator 54.

Figure 3:
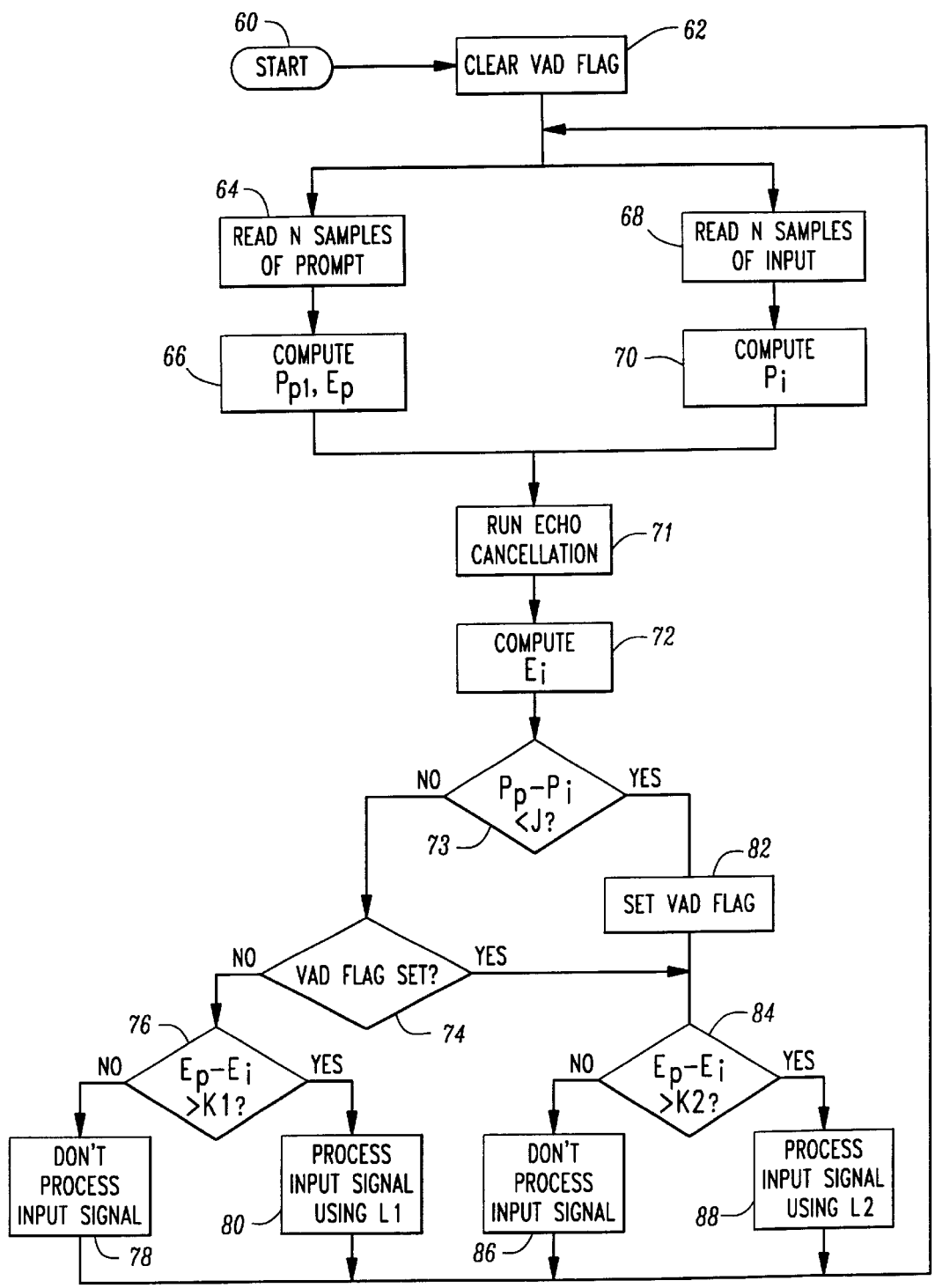
FIG. 3 is a flow diagram showing method steps for performing ASR talkoff suppression in accordance with the invention.

Turning now to FIG. 3, the logic flow of the ASR talkoff suppressor 24 is shown. From a start state 60, the VAD flag 48 is cleared in step 62. In steps 64 and 66, the prompt energy calculators 42 and 43 retrieve the M previous samples of the prompt signal plus N new samples of the prompt signal and computes $P_p$ (using M+N samples) and $E_p$ (using the IIR filter equation to update y{n} based on the N new samples). Simultaneously, in steps 68 and 70, the input signal energy calculator 44 retrieves N samples of the input signal and computes $P_i$.

In step 71, the echo canceller 22 performs echo cancellation on the input signal in accordance with a conventional echo cancellation algorithm. In step 72, the input signal energy calculator 44 retrieves N samples of the echo cancelled input signal from the output of the echo cancellation unit 22 and computes $E_i$ (using the IIR filter equation to update y{n} based on the N new samples).

In step 73, a test is made to determine if the $P_p-P_i<J$ dB. If not, a test is made in step 74 to determine whether the VAD flag 48 is set. If it is not, indicating that there is no incoming speech, a test is then made in step 76 to determine if $E_p-E_i>K1$. If not, the echo-cancelled input signal is delivered in unmodified form to the output port 40 in step 78.

If it is determined in step 76 that $E_p-E_i>K1$, the echo-cancelled input signal is whitened and attenuated in step 80 prior to delivering it to the output port 40.

If in step 73, it is found that $P_p-P_i<J$ dB, the VAD flag 48 is set in step 82. Following step 82, or if the test in step 74 is positive, a test is then made is step 84 to determine if $E-E_i>K2$. If not, the input signal is delivered in unmodified form to the output port 40 in step 86. If it is determined in step 84 that $E_p-E_i>K2$, the input signal is whitened and attenuated in step 88 prior to delivering it to the output port 40.

Following steps 78, 80, 86 and 88, control returns to steps 64 and 68. Once the prompt is finished, the ASR result has been found, and a new prompt begins, control restarts at processing step 60.

Accordingly, an ASR talkoff suppressor and related method for improving the operation of a prompt-and-collect voice transaction processing system have been described. While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for providing Automated Speech Recognition talkoff suppression in a prompt-and-collect voice transaction system, comprising the steps of:
    sending a prompt signal;
    receiving an input signal;
    comparing a characteristic of said prompt signal and said input signal; and
    processing said input signal to reduce the likelihood of an Automated Speech Recognition response thereto if the result of said comparison satisfies a predetermined criterion.

2. A method in accordance with claim 1 wherein said characteristic of said prompt signal is signal energy.

3. A method in accordance with claim 2 wherein said prompt signal energy is determined using a leaky integrator that employs an effective window length of a predetermined number of samples of said prompt signal.

4. A method in accordance with claim 1 wherein said characteristic of said input signal is an energy of said input signal following echo cancellation processing thereof (echo-cancelled signal).

5. A method in accordance with claim 4 wherein said echo-cancelled signal energy is determined using a leaky integrator that employs an effective window length of a predetermined number of samples of said echo-cancelled input signal.

6. A method in accordance with claim 1 wherein said comparing step includes determining an energy of said prompt signal, processing said input signal with an echo canceller to generate an echo-cancelled input signal, and determining the energy of said echo-cancelled input signal.

7. A method in accordance with claim 6 wherein said comparing step includes determining whether a difference between respective energies of said prompt signal and said echo-cancelled input signal is greater than a predetermined threshold.

8. A method in accordance with claim 1 wherein said processing of said input signal includes randomizing said input signal following echo cancellation processing thereof to make it more noise-like.

9. A method in accordance with claim 1 wherein said processing of said input signal includes attenuating said input signal following echo-cancellation processing thereof.

10. A method in accordance with claim 1 further including the step of determining whether said input signal corresponds to a person speaking, and if so, using a different criterion for evaluating said comparison than if said input signal does not correspond to a person speaking.

11. A method in accordance with claim 10 wherein said determining step includes determining a peak energy value of said prompt signal and a peak energy value of said input signal.

12. A method in accordance with claim 11 wherein said peak energy value is the determined as a square of a sample with a greatest energy out of a first predetermined number of samples of said prompt signal and a second predetermined number of samples of said input signal.

13. A method in accordance with claim 12 wherein said determining step includes determining whether the difference between the respective peak energy values of said prompt signal and said input signal is less than a predetermined threshold.

14. A system for providing Automated Speech Recognition talkoff suppression in a prompt-and-collect voice transaction system, comprising:
    means for sending a prompt signal;
    means for receiving an input signal;
    means for comparing a characteristic of said prompt signal and said input signal; and
    means for processing said input signal to reduce the likelihood of an Automated Speech Recognition response thereto if the result of said comparison satisfies a predetermined criterion.

15. A system in accordance with claim 14 wherein said characteristic of said prompt signal is signal energy.

16. A system in accordance with claim 15 wherein said prompt signal energy is determined using a leaky integrator that employs an effective window length of a predetermined number of samples of said prompt signal.

17. A system in accordance with claim 14 wherein said characteristic of said input signal is an energy of said input signal following echo cancellation processing thereof (echo-cancelled signal).

18. A system in accordance with claim 17 wherein said echo-cancelled signal energy is determined using a leaky integrator that employs an effective window length of a predetermined number of samples of said echo-cancelled input signal.

19. A system in accordance with claim 14 wherein said comparing means includes means for determining an energy of said prompt signal, means for processing said input signal with an echo canceller to generate an echo-cancelled input signal, and means for determining an energy of said echo-cancelled input signal.

20. A system in accordance with claim 19 wherein said comparing means includes means for determining whether a difference between respective energies of said prompt signal and said echo-cancelled input signal is greater than a predetermined threshold.

21. A system in accordance with claim 14 wherein said means for processing said input signal includes means for randomizing said input signal following echo cancellation processing thereof to make it more noise-like.

22. A system in accordance with claim 14 wherein said means for processing said input signal includes means for attenuating said input signal following echo cancellation processing thereof.

23. A system in accordance with claim 14 further including means for determining whether said input signal corresponds to a person speaking, and if so, using a different criterion for evaluating said comparison than if said input signal does not correspond to a person speaking.

24. A system in accordance with claim 23 wherein said determining means includes means for determining a peak energy value of said prompt signal and a peak energy value of said input signal.

25. A system in accordance with claim 24 wherein said peak energy value is the determined as a square of a sample with a greatest energy out of a first predetermined number of samples of said prompt signal and second predetermined number of samples of said input signal.

26. A system in accordance with claim 25 wherein said determining means step includes means for determining whether a difference between respective peak energy values of said prompt signal and said input signal is less than a predetermined threshold.

27. In a prompt-and-collect voice transaction system, a method for providing Automated Speech Recognition talk off suppression, comprising the steps of:

sending a prompt signal;

determining an energy value $E_p$ of said prompt signal by calculating an integrated energy value over approximately M samples of said prompt signal, where M is any suitable sampling number;

determining a peak energy value $P_p$ of said prompt signal by calculating a square of a largest energy value in M+N samples of said prompt signal, where M is the sampling number used to determine $E_p$ and N is any suitable sampling number that divides evenly into M;

determining an energy value $E_i$ of said input signal following echo-cancellation processing thereof (echo-cancelled input signal) by calculating an integrated energy value over approximately M samples of said input signal, where M is the sampling number used to determine $E_p$;

determining a peak energy value $P_i$ of said input signal by calculating a square of a largest energy value in N samples of said input signal, where N is the sampling number used to determine $P_p$;

calculating a first difference value of $P_p-P_i$, and if said first difference value is less than a predetermined threshold of J dB, determining that said input signal corresponds to a user speaking, and if said first difference value is equal to or greater than said predetermined threshold of J dB, determining that said input signal does not correspond to a user speaking;

calculating a second difference value of $E_p-E_i$, and if said second difference value is greater than a predetermined threshold K1 and said input signal does not correspond to a user speaking, or if said second difference value is greater than a predetermined threshold value K2 and said input signal corresponds to a user speaking, performing processing of said echo-cancelled input signal to reduce the likelihood of an Automated Speech Recognition response thereto; and wherein said processing of said input signal includes randomizing said echo-cancelled input signal to make it more noise-like and attenuating said echo-cancelled input signal.

* * * * *